Oct. 1, 1957 J. E. MAYNARD ET AL 2,808,513

BISTABLE OSCILLATION TRIGGER CIRCUITS

Filed May 16, 1955 3 Sheets-Sheet 1

INVENTORS.
JOHN E. MAYNARD
ROBERT L. BROCK
BY
Reynolds, Beach & Christensen
ATTORNEYS C8a = .01 mf
C8b = 173 mmf
C8c = 134 mmf
L8b = 500 mh
L8c = 500 mh
R8a = 2.2 K
R8b = 100 ohms
R8c = 100 ohms
E8a = 30 V.
E8b = 1.5 V.

C9a = 100 mmf
C9b = 480 mmf
C9c = 504 mmf
C9d = 46 mmf
C9e = 1000 mmf
C9f = 1.0 mf
C9g = 6800 mmf
L9a = 55 mh
L9b = 606 mh
L9c = RF CHOKE
R9a = 15 K INVENTORS.
JOHN E. MAYNARD
ROBERT L. BROCK
BY
Reynolds, Beach & Christensen
ATTORNEYS

BISTABLE OSCILLATION TRIGGER CIRCUITS

Filed May 16, 1955

3 Sheets-Sheet 3

INVENTORS.
JOHN E. MAYNARD
ROBERT L. BROCK
BY
ATTORNEYS 2,808,513

BISTABLE OSCILLATION TRIGGER CIRCUITS

John E. Maynard, Mercer Island, Wash., and Robert L. Brock, Corvallis, Oreg., assignors to Boeing Airplane Company, Seattle, Wash., a corporation of Delaware Application May 16, 1955, Serial No. 508,570

15 Claims. (Cl. 250—36)

This invention relates to a new and useful bistable trigger circuit, and more specifically comprises a novel oscillator circuit having two stable oscillation frequencies and means for changing its operation from either frequency to the other by a triggering or momentary sustained-oscillation-interrupting action. The invention is herein illustratively described by reference to the presently preferred forms thereof; however, it will be recognized that certain changes and variations therein, especially with respect to details, may be made without departing from the underlying essentials.

Conventional bistable trigger circuits of the Eccles-Jordan type are D. C. circuits having two stable equilibrium conditions. Such circuits may be switched back and forth between these operating conditions by successive trigger pulses, producing one output pulse of a given polarity for every two input pulses. Typical applications of Eccles-Jordan type scale-of-two circuits include counting stages of binary digital computers, remote control of circuit voltage, gating circuits, and others.

Attempts to produce reliable bistable D. C. trigger circuits using transistors are not very successful, however, because of undesirable transient heating effects on the transistor characteristics resulting from the switching of direct current on and off in the circuit. This thermal sensitivity causes unreliable trigger response particularly when the trigger pulses recur at variable rates. An object of the present invention is to provide a bistable trigger circuit which may utilize transistors successfully, largely overcoming the foregoing problem. In accordance with the invention the maintenance of either of two steady-state oscillating conditions in the circuit establishes a substantially constant energy level so that the transistor elements remain at approximately a constant operating temperature independently of switching rate. However, it will be recognized that while the invention is particularly suited for transistor circuits it may be applied as well to vacuum tube amplifiers or other types of amplifiers.

Another object of the invention is a bistable oscillation circuit having two alternatively established oscillation frequencies and adapted for substantially instantaneous change-over from either such frequency to the other. A related object is such a bistable oscillation circuit controllable by successive voltage impulses of predetermined duration for changing the oscillation frequency back and forth between the two established frequencies.

Another object of the invention is the provision of bistable oscillation trigger circuit means operable in response to successive input pulses for producing an output pulse with every second input pulse, thereby to produce sale-of-two operation useful in binary digital counting circuits and similar applications.

A related object of the invention is a versatile bistable oscillation trigger circuit which may be triggered back and forth between either of two stable oscillating frequencies within any of different predetermined time periods, depending upon constants of the circuit, by any of different control media, including trigger pulses or switch-opening and closing action, and the principles of which may be applied to any of different basic types of oscillator circuits and to meet any of different load impedance requirements.

Still another object of the invention is such a trigger circuit which may be designed for operation initially at either of its two stable operating frequencies, in accordance with an applied bias or energizing voltage.

In general the invention achieves the foregoing objects by use of fixed-tuned resonant circuits which remain connected in the circuit and coupled to each other continuously in the same relationship. Two such resonant L-C circuit combinations are required. Both have approximately the same natural frequency and are coupled together for interchange of energy therebetween in a manner establishing two resonance frequencies, one above and the other below such natural frequency. Oscillation-sustaining means either in the form of a negative resistance element or an amplifier, with suitable positive feedback, is connected in oscillation-sustaining relationship with at least one of said resonant circuits to produce sustained oscillations at either of said two resonance frequencies. The desired triggering action effecting switching from one such frequency to the other is effected by momentarily rendering said oscillation-sustaining means inoperative, or, alternatively, by interrupting the oscillation-sustaining or feedback connection thereof to the resonant circuit, for a predetermined time period during which said resonant circuits are placed in free oscillation. During such free oscillation period both of said resonance frequencies exist in the resonant circuits, with the respective energy levels at the two frequencies predominating alternately. By establishing the duration of said interruption period so that oscillation-sustaining operation is restored in the circuit at an instant when that frequency predominates which was dormant at the inception of said interruption period, sustained oscillations will be reestablished in the circuit at this new frequency. By maintaining the same interruption period on successive triggerings of the circuit the oscillation frequency is caused to alternate back and forth between said two resonance frequencies at a rate equal to half the triggering rate.

Another feature of the invention therefore resides in the provision of such a bistable oscillation circuit in combination with a recurringly operative source of control voltage pulses of predetermined duration connected thereto for intermittently interrupting sustained oscillation operation in said circuit to change the operating frequency thereof with every applied pulse. A related feature is the provision of a pulse generating circuit connected in the output of said sustained oscillation circuit and responsive to a frequency transition therein from a particular one of the two stable frequencies to the other such frequency for producing a voltage impulse therefrom, whereby scale-of-two operation is achieved useful in binary digital counter stages and similar applications. As a further feature two or more such bistable oscillators are arranged in cascade, with a pulse generating circuit for triggering the successive stages from the frequency transitions in the respective immediately preceding stages, thereby to produce a counting circuit action.

These and other features, objects and advantages of the invention will become more fully evident from the following description thereof by reference to the accompanying drawings showing the preferred embodiments and certain variations thereof, together with certain operating principles involved.

Figure 1:
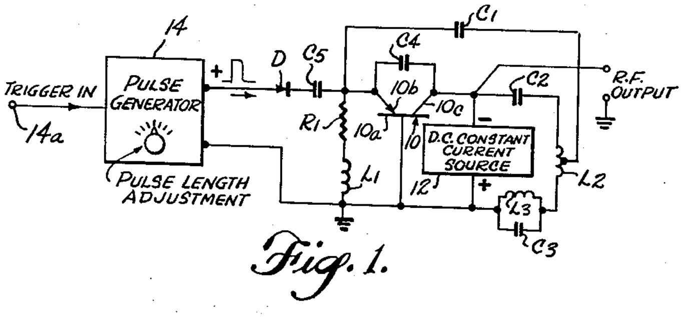
Figure 1 is a schematic diagram of one form of the novel bistable oscillation trigger circuit and pulse generating means, shown in block diagram form, for triggering the same.

In the circuit of Figure 1 the oscillation sustaining means or element comprises the transistor 10, having the base 10*a*, the emitter 10*b* and collector 10*c*. To be suitable for operation in this particular circuit, the transistor should be of a type having low internal base resistance, hence capable of operation at low collector voltages. A suitable commercial transistor meeting this requirement is the General Electric Company type G11. The direct-current power source 12 is of the constant-current type meeting specifications set forth hereinafter. The negative terminal of this power source is connected to the collector 10*c* and the positive terminal, to the base 10*a*. Transistor bias is developed by connecting the resistance R1 and the inductance L1 in series between the emitter 10*b* and the base 10*a*. The two coupled resonant circuits necessary to the two-frequency oscillation condition in this particular case comprise the parallel resonant circuit including the condenser C3 and the inductance L3, and the series-resonant circuit including the condenser C2 and the inductance L2. These two circuits are arranged in energy-exchange relationship by connecting them directly in series, with the parallel resonant circuit L3, C3 being connected to the transistor base, and the series-resonant circuit L2, C2 being connected to the collector 10*c*, with the condenser situated nearest the collector. Actually, the series resonant circuit L2, C2, further includes the by-pass condenser C4 connected directly between transistor collector and emitter, and the additional condenser C1 connected between the transistor emitter and a tap on the inductance L2, as shown.

Triggering of this circuit to effect change-over from either stable oscillation frequency to the other stable oscillation frequency is accomplished by application of control pulses of positive relative polarity to the transistor emitter 10*b* through the isolating crystal rectifier D and the coupling condenser C5. These trigger pulses are derived from the pulse generator 14 which may comprise a multivibrator, blocking oscillator or other suitable type of pulse generating trigger circuit capable of delivering pulses of predetermined amplitude and duration in response to input triggering signals applied to its input terminal 14*a*. The details of a suitable pulse generator may vary, and constitute no part of the present invention.

In order for the circuit of Figure 1 to operate in the intended manner, it is of course necessary that it possess two stable operating frequencies, and so that a reliable or useful result may be accomplished thereby it is further necessary that the circuit oscillate with appreciable amplitude in each condition of oscillation. It is also preferable or desirable for utility and reliability that the oscillation amplitudes in the two conditions be of the same general order of magnitude.

In order to demonstrate that two distinct frequencies of resonance are present, in the circuit of Figure 1, and that either such frequency may be caused to predominate at any time under controlled conditions, it is convenient to study the transistor circuit by a comparison with an equivalent vacuum tube amplifier type of circuit. In particular, in order to design a bistable oscillation circuit using a transistor as in Figure 1, from a theoretical standpoint it is convenient to employ the so-called duality relationship between transistors and vacuum tube triodes, by first analyzing the relationships in an equivalent vacuum tube circuit and then converting the resulting equations into a form applicable to the corresponding transistor circuit. This conversion may be accomplished by noting that the transistor currents behave relatively in approximately the same manner as the negative of the reciprocals of the triode voltages assuming the triode plate, cathode and grid correspond to the transistor collector, emitter and base, respectively.

Figure 6:
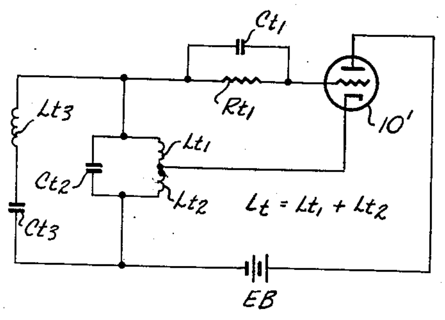
Figure 6 is a vacuum tube version of the transistor circuit shown in Figure 1 and from which is theoretical derivation of the circuit design in Figure 1 may be developed as described hereinafter.

The Hartley type triode oscillator shown in Figure 6 may be used as the starting point in the design of the circuit shown in Figure 1. The triode 10' has its plate connected to the positive terminal of plate-voltage source E*b*. The series resonant circuit L*t*3, C*t*3 is connected in shunt to the parallel resonant circuit L*t*, C*t*2 (where L*t*=L*t*1+L*t*2). The control grid of the triode is coupled through condenser C*t*1, by-passed by resistance R*t*1, to one side of the resonant circuits. The opposite side thereof is connected to the negative terminal of voltage source E*b*. The cathode of the triode is connected directly to a point between L*t*1 and L*t*2 as shown.

Referring to Figure 6, it may be demonstrated that the impedance of the series branch circuit including inductance L*t*3 and condenser C*t*3, when the deviation of excitation frequency departs by only a small amount from the resonance frequency, is approximately $$\overline{Z}_s=R_s\,(1+jS_s)$$

where $R_s$ is the effective resistance of the branch and $$S_s=Q_s\frac{(\omega-\omega_0)(\omega-\omega_0)}{\omega_0\omega}$$

i. e. $Q_s$ is the Q of the branch, $\omega$ $(=2\pi f)$ is the excitation frequency in radians per second, and $\omega_0(=2\pi f_0)$ is the resonance frequency of the branch in radians per second. Similarly, it may be shown that the impedance of the parallel branch circuit including inductance L*t* (equals L*t*1 plus L*t*2) and condenser C*t*2, under assumption similar to that stated for the series branch case above, is approximately $$\overline{Z}_p=\frac{R_p}{1+S_p^2}-j\frac{R_pS_p}{1+S_p^2}$$

where $R_p$ is the effective resistance of the parallel branch and $$S_p=Q_p\left(\frac{\omega}{\omega_0}-\frac{\omega_0}{\omega}\right)$$

i. e. $Q_p$ is the Q of the branch, $\omega$ is the excitation frequency, and $\omega_0$ is the resonance frequency of the branch, as before.

If a high total circuit Q is assumed, the total or combined circuit resonance condition is obtained by equating the active terms of the above two equations and, remembering that two real and distinct frequencies are required, developing the following relationships:

$$R_p^2>\omega_0^2\,Lt3.\times(Lt1+Lt2)$$

and $$\left(\pi^2\frac{(Lt1+Lt2)^2}{R_p^2}-\frac{Lt1+Lt2}{4f_0^2Lt3}+\frac{1}{f_0^2}\right)f^2-\frac{2f}{f_0}+1=0$$

The above two equations establish the requirements for existence of two distinct frequencies of resonance in the circuit of Figure 6.

Selection of circuit components satisfying these two requirements are then made such that Ct1 and Ct3 have values which make the parallel and series resonance branches independently resonant at the frequency $f_0$. Specific calculations are most readily made on a trial and error basis, keeping in mind the necessity of satisfying not only the derived equations, but also the requirements resulting from the assumptions upon which the derivations are based, as stated above.

In order to transform the above triode vacuum tube circuit (Figure 6) into the transistor counterpart to obtain the circuit of Figure 1, a transfer resitsance $r$ for the transistor is selected which relates vacuum tube voltages and currents to transistor currents and voltages respectively. The next step is to write the Kirchhoff equations for the vacuum tube circuit and to derive the inverse transformation of these equations so as to establish the Kirchhoff equations for the transistor circuit as previously indicated. The following table of relationships is then obtained for the selection of transistor circuit components in terms of the related vacuum tube circuit components (cf. Figures 1 and 6, for symbols).

$$Lt1=r^2C1$$

$$Rt1=r^2R1$$

$$Ct1=\frac{L1}{r^2}$$

$$Ct2=\frac{L2}{r^2}$$

$$Lp2=r^2\times C2$$

$$Ct3=\frac{L3}{r^2}$$

$$Lt3=r^2\times C3$$

The transistor circuit developed theoretically in this manner from the basic triode circuit shown in Figure 6 does not include the condenser C4 (Figure 1) nor a connection from the condenser C1 to a tap on inductance L2. Rather, the latter connection was found to be necessary as a practical necessity for purposes of improving the impedance match from the collector to the emitter circuit. This change affected the practical value of inductance L2 from the theoretically determined value, in order to correct for the change of resonance frequency brought about thereby, and also to correct for the addition of C4, which was found to be necessary in order to produce an operative circuit apparently for the reason that Lt2, Ct2 and Ct1 (Figure 6) form a series circuit of which any small inter-element capacitances will be a part in the case of the triode circuit, which capacitances are not present appreciably in the case of the transistor, so that in effect the condenser C4 is necessary in order to complete the transistor circuit as a true counterpart of the vacuum tube triode circuit used as the design basis.

The following table of values of components used in the circuit of Figure 1 results in a practical bistable oscillation trigger circuit, wherein the two stable oscillating frequencies are 425 kc. and 500 kc.;

C1=420 μμf.
C2=170 μμf.
C3=2300 μμf.
C4=600 μμf.
C5=.01 μf.
R1=400 ohms
L1=2.5 mh.
L2=1100 μh.
L3=55 μh.

Current source—1.8 milliamps. at collector voltages below 10 volts.

Transistor—General Electric Type G11.

Crystal rectifier (D)—IN34R.

An operative vacuum tube circuit such as that shown in Figure 6 results from the following table of values for such circuit, from which the theoretical determination of the particular values for Figure 1 was based in the example case:

Lt1=2.2 mh.
Rt1=440 ohms
Ct1=60 μμf.
Ct2=170 μμf.
Lt2=550 μh.
Ct3=2300 μμf.
Lt3=55 μh.

Figure 2:
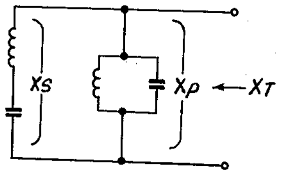
Figure 2 is a schematic diagram of the tuned networks functioning in the circuit in Figure 1 to illustrate terminology employed in Figures 3, 4 and 5.

A qualitative explanation of the reason for co-existence of two stable oscillating frequencies alternately attainable in the circuits of Figures 1 and 6 may be made by reference to Figures 2 to 5, inclusive. Figure 2 illustrates the essential relationship between the series resonant network and the parallel resonant network. From the standpoint of circuit analysis this particular combination of resonant L-C circuits is one of the simplest. The quantity $X_s$ represents the reactance of the series resonant circuit acting alone, and the quantity $X_p$ represents the reactance of the parallel resonant circuit acting alone. A third quantity, $X_t$, represents the combined reactances of these two circuits connected across each other.

Figure 3:
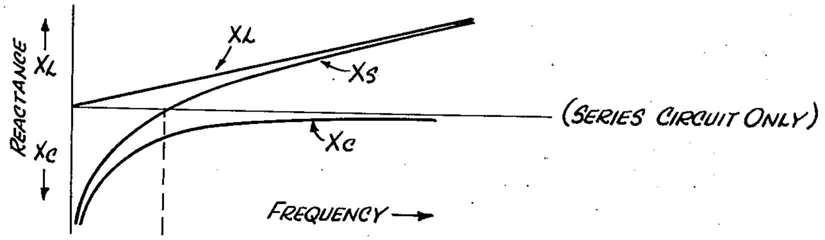
Figures 3, 4 and 5 are reactance-frequency graphs which illustrate certain operating principles in the circuit of Figure 1.

The graph shown in Figure 3 applies to the series resonant circuit acting alone. It will be noted that the curve $X_s$ is the resultant of the separate reactance curves $X_1$ (the reactance of the inductance) and $X_c$ (the reactance of the capacitance). The curve $X_s$ intersects the zero reactance line at the resonant frequency of the circuit.

Figure 4:
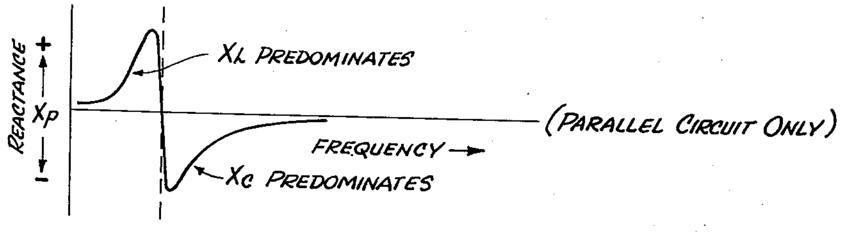

Referring to Figure 4, representing the reactance curve of the parallel resonant circuit acting alone, the familiar positive and negative humps of a parallel tuned circuit is illustrated. As frequency increases, the reactance of the circuit progressively increases to a high positive peak, wherein the inductive component predominates. A further increase of frequency causes an abrupt reversal of reactance, passing through the zero reactance axis at the resonance frequency of the circuit. The negative peak is then formed by predominance of capacitive reactance accompanying a further increase of frequency.

Figure 5:
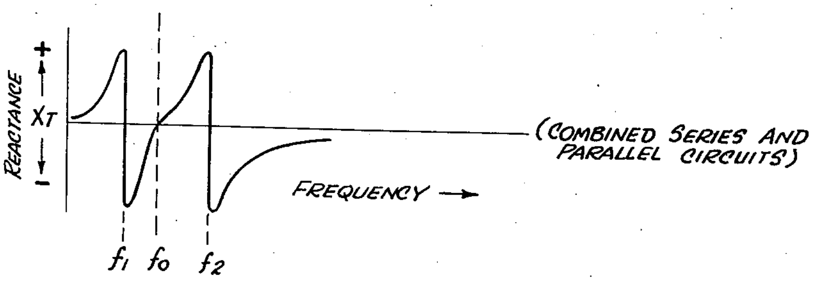

The combination of the two networks produces the complex reactance curve shown in Figure 5, having two positive humps and two negative humps. The curve crosses the zero reactance axis at three points, only one of which corresponds to the resonance frequency $f_0$ of the two resonant circuits acting alone. This is not a stable frequency state for the circuit, however. On the contrary, the other two intersecting points, at frequencies $f_1$ and $f_2$, respectively below and above $f_0$, are the two stable frequency states for the circuit, which means that sustained oscillations may be established in the combination circuit only at these two latter frequencies, $f_1$ and $f_2$.

It is found that if a complex network consisting of a dual resonant circuit combination such as that shown in Figure 2 is set into free oscillation, both of the resonance frequencies $f_1$ and $f_2$ will exist and, as the energy is gradually dissipated, the amplitude of these oscillations will be such that first the frequency $f_1$ will predominate, and then the frequency $f_2$ will predominate, alternating back and forth in this manner at a periodicity which depends upon the circuit constants including the energy exchange relationship between the resonant circuits. The length of this period may readily be observed in the test laboratory by sustaining oscillations in the combination circuit at one frequency, as in the actual oscillator of Figure 1, for instance, and then removing the source of sustaining power to note on an oscilloscope the periodicity of the energy exchange. It is found that the periodic interchange of energy between the two frequencies is substantially the same for both transitions, that is, that the change from predominance of one frequency to predominance of the other frequency takes place in substantially the same period of time as the reverse change, a fact which is most useful in the practice of the present invention, since it means that the triggering pulses applied by the pulse generator 14 to the oscillating circuit of Figure 1 may be of uniform length. The length of these triggering pulses is selected to be an integral multiple, including a multiple of one, of about one-half the period of the described energy interchange. It will therefore be evident that the selection of a suitable pulse length producing triggering of the circuit will depend upon the circuit constants in a particular case.

Assuming the circuit of Figure 1 is oscillating at one of the frequencies $f_1$ or $f_2$, which it will do stably for any practically desirable length of time, the application of a trigger pulse from the generator 14 to the transistor emitter has the effect of biassing the transistor out of operation as an oscillation-sustaining element. Thus the interconnected resonant circuits go into free oscillation, a condition during which the stored energy is represented by the two separate free oscillation frequencies but is interchanged between these frequencies at the periodicity or modulation rate characteristic of the particular circuit. If the trigger pulse terminates at a time when one frequency predominates, then the circuit will resume sustained oscillations at that particular frequency, whereas it will do so at the other frequency if the trigger pulse terminates when the latter predominates. Preferably the trigger pulse is chosen to be equal to about one-half or the full duration of the frequency predominance cycle in the free-oscillating resonant circuits so that the stable oscillation frequency is changed by the circuit interruption, but it will be evident that longer pulses constituting multiples in duration of the shortest operative pulse may be used to a similar end. A relatively short pulse is desirable, however, since the rate of energy decay due to dissipation in the resonant circuits must be considered.

In general, the choice of a suitable transistor for use in the circuit of Figure 1, apart from the consideration of having a low internal base resistance capable of operation at low collector voltages, is that the transistor be generally of the type capable of operation under a relatively wide range of operating temperatures. There is no sharp dividing line between transistors meeting this latter general requirement and those which might be classified as exhibiting high sensitivity to ambient temperature changes, except of the presently available transistors those which exhibit internal feedback of a regenerative type tend to be more sensitive to temperature changes than those which do not, hence the latter provide more reliable operation in circuits of the present invention.

Figure 7:
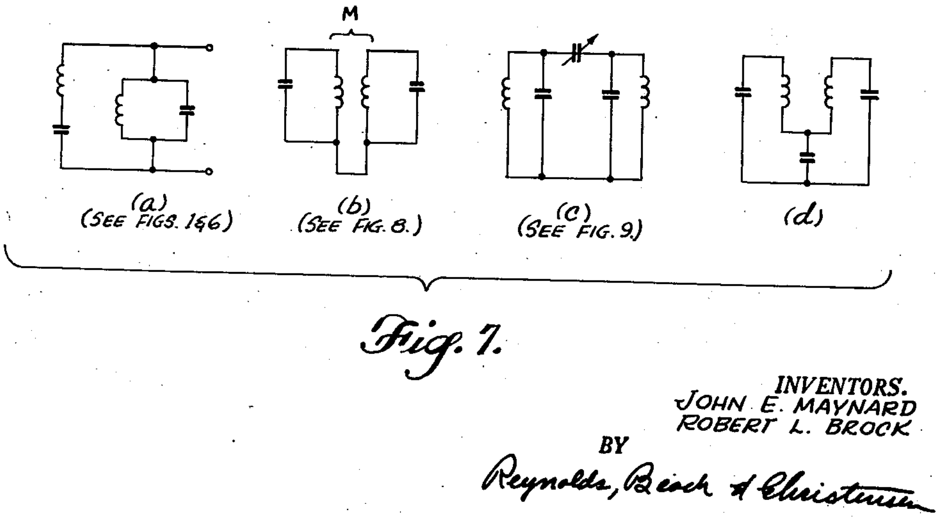
Figure 7 illustrates different resonant network arrangements employing two tuned circuits upon which may be based the design of bistable oscillation trigger circuits in accordance with the present invention.

Figure 7 illustrates four different possible combinations of two resonant circuits which may be used in forming bistable oscillation trigger circuits in accordance with the present invention. Figure 7*a* represents the combined parallel and series resonant circuit network used in Figures 1 and 6. Figure 7*b* shows two parallel resonant circuits with mutual coupling between the respective inductance elements thereof. In Figure 7*c* the two parallel resonant circuits are connected in energy exchange relationship by a capacitative coupling element. In Figure 7*d* energy coupling between the two parallel resonant circuits occurs through a capacitance element common to the two parallel resonant circuits.

Figure 8:
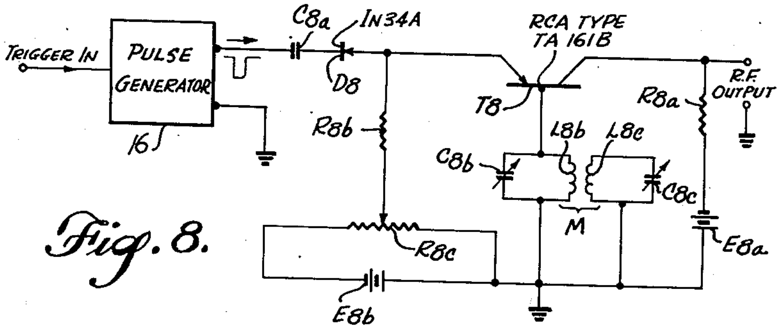
Figure 8 is a schematic diagram of a second form of bistable oscillation trigger circuit and triggering means therefor, employing a transistor.

The modified transistor bistable oscillation circuit shown in Figure 8 utilizes the arrangement shown in Figure 7*b*. It is a simpler circuit than that used in Figure 1, although is somewhat more critical in operation. In this case external feedback is not employed to sustain oscillations; instead, the transistor T8 is of the type having a large internal base resistance, and its negative resistance characteristic is utilized to sustain oscillations in the circuit. The circuit does not require a constant current source as in Figure 1, hence is more flexible in its design and application.

In Figure 8 the two parallel resonant circuits L8*c*, C8*c* and L8*b*, C8*b* have one side connected to ground and are arranged for mutual inductive coupling between their respective inductance elements. The resonant circuit L8*b*, C8*b* is connected between the base of transistor T8 and ground. Operating voltage for the transistor is derived from the source E8*a* connected in series with the load resistance R8*a*. The R. F. output from the circuit is derived from across this resistance as indicated. Bias for the transistor is derived from the potentiometer R8*c* connected across the bias source E8*b*. Bias voltage is applied to the emitter through the current limiting resistor R8*b*. The input pulses causing triggering of the circuit are derived from the source 16 and in this case are of negative polarity with respect to ground. These pulses are applied through coupling condensers C8*a* and isolating diode rectifier D8. A set of practical values for the different components of this circuit in a typical case are listed in the table in the figure.

In order for the circuit of Figure 8 to operate in the intended manner, the coefficient of coupling between resonant circuits should be greater than $$\frac{R2}{\omega_0 L_2}$$

where R2 is the effective resistance of the secondary circuit (L8*c*, C8*c*) and where $\omega_0$ is the angular frequency of resonance in radians per second of either tuned circuit alone. It may be shown that the value for the coefficient of coupling must be considerably less than unity if the two resonance frequencies are to be reasonably close to each other. In order to design the circuit of Figure 8 by a generally analytical approach, a suitable operating frequency is chosen. Both the primary and secondary resonant circuits must then be separately resonant at that frequency. L8*c* is then chosen such that its Q factor will satisfy the relationship just stated for a coefficient of coupling that is readily achieved and is not too close to unity for the reason stated above. The remaining constants of the coupled circuits are chosen such that resonance occurs for each circuit alone at the chosen frequency, or, if desired, at slightly different frequencies for a reason hereinafter explained. The two stable frequencies actually resulting may be predicted by analysis or by experimental methods. Adjustment of the coupling M between resonant circuits may then be required in order to obtain the desired operating characteristics. Precise design of certain components requires a study of the negative base resistance characteristic of the selected transistor. However, it is generally sufficient to employ a high-Q tank circuit and adjust the bias conditions until the desired operation is obtained. Resistances R8*b* and R8*a* tend to reduce the regenerative action, hence the amplitude of oscillation, but they also serve as current limiting resistors protecting the transistor elements. Resistance R8*b* has a much more pronounced effect on regeneration than resistance R8*a*, and serves as an input resistance across which the control pulse may be applied as shown.

If the resonant coupled circuits (such as those used in Figure 8) are tuned to slightly different frequencies one of the two stable resonant frequencies of the complex network in any of the illustrated forms will be nearer than the other to the maxima or humps of the response curve of the network. As a result the bistable oscillation circuit will have a higher oscillation amplitude at one frequency than at the other. A useful purpose served by such an adjustment is the discrimination between frequencies of operation by amplitude of the oscillation as detected in a rectifier circuit without the necessity of added frequency discrimination circuits. Another useful purpose served by such an adjustment is that the oscillation circuit will always start oscillations at the higher amplitude frequency when the circuit is initially energized by D. C. power. This offers a convenient means of indexing or resetting the circuit to a selected initial stability condition.

Figure 9:
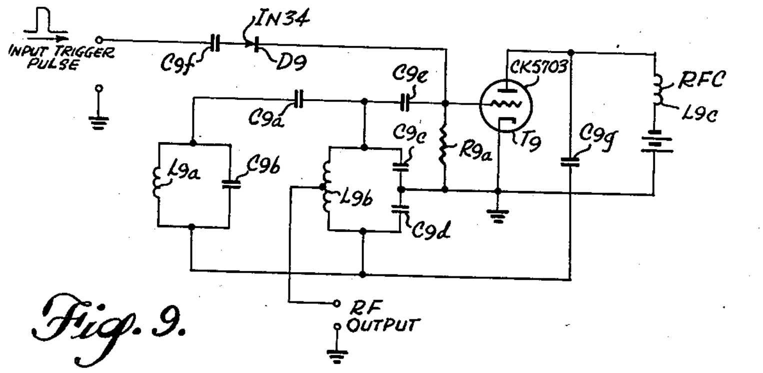
Figure 9 is a third form of bistable oscillation trigger circuit employing in this case a vacuum tube.

Figure 9 illustrates a vacuum tube amplifier bistable oscillator using the basic resonant circuit arrangement depicted in Figure 7*c*. In this circuit the coupling condenser C9*a* interconnecting the two resonant circuits is somewhat critical. The positive polarity trigger pulses controlling operation of the circuit are applied through coupling condenser C9*f* and isolating diode D9 to the control grid of the amplifier tube T9. The first or primary resonant circuit comprises the inductance L9*b* shunted by the series-connected condensers C9*c* and C9*d*. One side of this circuit is connected to the anode of tube T9 through the feedback condenser C9*g* and the opposite side thereof is connected to the control grid of the tube through the coupling condenser C9*e*. The secondary resonant circuit comprises the inductance L9*a* and condenser C9*b*. The output oscillations are derived from the tap on the primary circuit inductance L9*b*, as indicated in the figure. A suitable set of values for the different components used in this circuit in a practical case are listed in the table shown in the figure.

Figure 10:
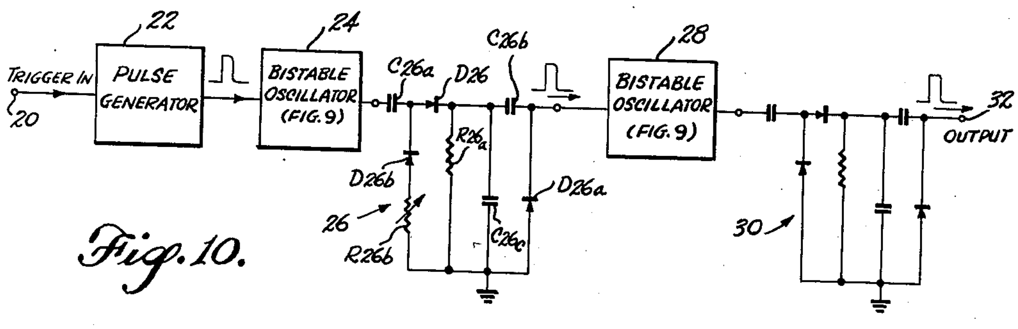
Figure 10 is a diagram, partially schematic in form, illustrating one application of the invention to a scale-down or counting circuit.

The circuit illustrated in Figure 9 functioning as a bistable oscillation trigger circuit is adapted for application as a scale-of-two circuit which may be used, for example, in a binary digital computer. In Figure 10 a two-stage counting circuit arrangement is illustrated, wherein an output pulse is produced with every fourth input pulse or trigger applied to the input terminal 20. The pulse generator 22 is triggered into operation by the input trigger and produces an output pulse which is applied to the bistable oscillator 24 similar to that shown in Figure 9. The duration of the pulse applied to this oscilaltor is determined so that the bistable oscillator undergoes a frequency transition with every applied pulse. The output R. F. energy from the bistable oscillator 24 is then applied to means responsive to a change of stable oscillation amplitude, in one sense or direction of change, such network comprising a combined filter and differentiating network 26 which converts one frequency transition but not the other into a control pulse applied to a second bistable oscillation trigger circuit 28 also similar to the circuit shown in Figure 9. The R. F. output of the latter is then applied to a second combined filter and differentiating network 30 similar to the network 26 to produce an output pulse at the terminal 32 with every fourth trigger pulse applied at the input terminal 20.

The circuit means 26 comprises the coupling condenser C26*a* passing the high-frequency voltages from oscillator 24 to the voltage-doubling detecting circuit including the shunt-connected diode D26*b* placed in series with load resistance R26*b*, and the diode D26 connected serially between the junction of condenser C26*a* and the diode D26*b*, and condenser C26*b*. The polarities of the diodes are such that a direct voltage of positive polarity develops across load resistance R26*a* connected between ground and the junction between D26 and C26*b*. Filter condenser C26*c* shunted across R26*a* suppresses high-frequency ripple and modulation frequency components during free oscillation of circuit 24.

The resultant rectified voltage at the input side of C26*b* is of rectangular wave form of a duration determined by the interval between successive triggers. This wave form is differentiated by C26*b* and diode D26*a*. The back resistance of D26*a* allows a large positive pulse to develop for application to circuit 28, whereas the low forward resistance of D26*a* practically eliminates any negative pulse which normally might accompany such differentiation.

Obviously the filter circuit 26 of the amplitude-transition selective type is merely representative of a means including amplitude or frequency selective filters or circuits for converting one particular circuit transition (i. e. from one stable frequency to the other) into an output response.

Figure 11:
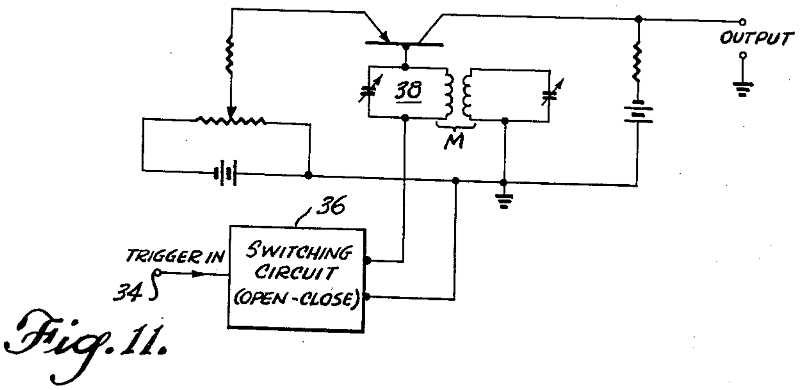
Figure 11 is a circuit similar to that shown in Figure 8 with a modified triggering arrangement.

In the preceding examples the trigger pulses by which the illustrated bistable oscillation trigger circuits are switched back and forth between their two operating frequencies function to render inoperative the transistor or the amplifier tube which sustains continuous oscillations in the circuit. This takes place by biasing the control element to the point of inoperability. However, there are other ways of accomplishing the same end result, which is to place the resonant circuits momentarily in a state of free oscillation, during which the described periodic energy interchange between the two resonance frequencies takes place. One such alternative method is illustrated in Figure 11, illustrating a bistable oscillation circuit generally similar to that shown in Figure 8. In this case, however, the parallel resonant circuits are placed in free oscillation by the application of a trigger pulse to input terminal 34 controlling a switching circuit 36 interposed in the ground return lead for the primary resonant circuit 38, as shown. Normally the primary resonant circuit 38 would be connected directly between the transistor base and ground, but in this case the connecting lead passes through a controlled (open or closed) switch represented as the switching circuit 36. When the input trigger is applied to the terminal 34, this switch is effectively opened, thereby removing the source of oscillation-sustaining energy, which is the transistor circuit, from the tuned circuits so that the latter are placed in free oscillation. Upon termination of the trigger pulse the switch is caused effectively to reclose with results equivalent to the termination of the trigger pulse applied in the case of Figure 8.

Figure 12:
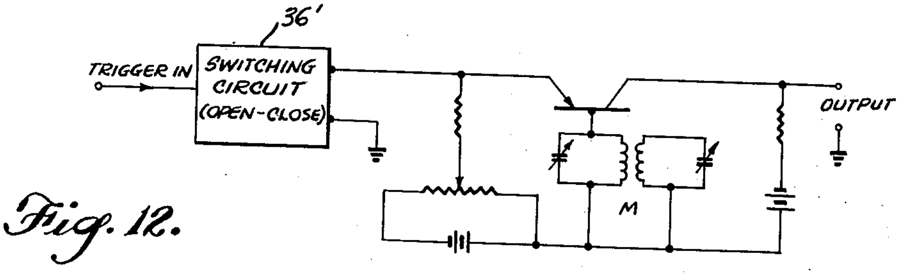
Figure 12 is likewise a circuit similar to that shown in Figure 8 with a second modified triggering arrangement.

In the variation shown in Figure 12 the triggered switching circuit 36' is connected between ground and the emitter of the transistor, and acts as a bias-removing device shunted across the bias circuit for the transistor oscillator. The effect is to take the transistor out of oscillation-sustaining operation momentarily for placing the resonant circuits in free oscillation.

We claim as our invention:

1. Bistable oscillation trigger circuit means comprising, in combination, a first resonant circuit means, a second resonant circuit means coupled in energy exchange relation to said first resonant circuit means and having approximately the same natural resonance frequency as said first resonant circuit means, a source of oscillation sustaining power, oscillation-sustaining means, means forming a sustained oscillation circuit operatively connecting said oscillation sustaining means in circuit with said power source and one of said resonant circuit means to produce sustained oscillations in said sustained oscillation circuit at one of two stable oscillation frequencies respectively above and below said natural resonance frequency, determined by the circuit constants of both of said resonant circuit means and the energy exchange relationship therebetween, and triggering means connected to said sustained oscillation circuit, recurringly operable for predetermined limited time periods to interrupt application of oscillation-sustaining power to said one resonant circuit means, whereby during such time periods free oscillations at both of said stable oscillation frequencies occur in both resonant circuit means at energy levels periodically alternating between predominance of one such frequency and then the other, said time periods having a predetermined duration related to the periodicity of such periodic alternation such that sustained oscillations are reestablished in said circuit means by termination of each such interruption period at a time during energy predominance of the oscillation frequency other than that sustained in said circuit means at the initiation of each such interruption period.

2. The circuit means defined in claim 1, wherein the energy interrupting means comprises a source of voltage pulses connected to the oscillation-sustaining means, said oscillation-sustaining means being subject to disablement by application of such voltage pulses thereto.

3. The circuit means defined in claim 1, wherein the energy interrupting means comprises switch means interposed in the sustained oscillation circuit and subject to periodic operation to open said circuit.

4. The circuit means defined in claim 1, wherein the oscillation-sustaining means comprises an amplifier having a control element, and the sustained oscillation circuit includes a connection applying drive energy from the power source to the said one resonant circuit means, and a positive feedback connection from one of the resonant circuit means to said amplifier control element to sustain oscillations in the circuit means, and wherein the energy interrupting means comprises switch means interposed in said feed-back connection and operable periodically to interrupt said connection.

5. Bistable oscillator means comprising, in combination, a first resonant circuit means, a second resonant circuit means having approximately the same natural resonance frequency as said first resonant circuit means and coupled thereto in predetermined energy exchange relationship therewith establishing two free oscillation frequencies in said first and second resonant circuit means respectively above and below said natural resonance frequency, a power source, oscillation-sustaining means operatively connecting said power source to one of said resonant circuit means for producing sustained oscillations at either of said two oscillation frequencies, and means operable to interrupt sustained oscillations at either such oscillation frequency for establishing sustained oscillations at the other such oscillation frequency.

6. Bistable oscillator means comprising, in combination, a first resonant circuit means, a second resonant circuit means having approximately the same natural resonance frequency as said first resonant circuit means and coupled thereto in predetermined energy exchange relationship therewith establishing two free oscillation frequencies in said first and second resonant circuit means respectively above and below said natural resonance frequency, a power source, and oscillation-sustaining means operatively connecting said power source to one of said resonant circuit means for producing sustained oscillations at either of said two oscillation frequencies.

7. Scale-of-two circuit means comprising, in combination, a first resonant circuit means, a second resonant circuit means coupled in energy exchange relation to said first resonant circuit means and having approximately the same natural resonance frequency as said first resonant circuit means, a source of oscillation-sustaining power, oscillation-sustaining means, means forming a sustained oscillation circuit operatively connecting said oscillation-sustaining means in circuit with said power source and one of said resonant circuit means to produce sustained oscillations in said sustained oscillation circuit at one of two stable oscillation frequencies respectively above and below said natural resonance frequency, determined by the circuit constants of both of said resonant circuit means and the energy exchange relationship therebetween, triggering means connected to said sustained oscillation circuit, recurringly operable for predetermined limited time periods to interrupt application of oscillation-sustaining power to said one resonant circuit means, whereby during such time periods free oscillations at both of said stable oscillation frequencies occur in both resonant circuit means at energy levels periodically alternating between predominance of one such frequency and then the other, said time periods having a predetermined duration related to the periodicity of such periodic alternation such that sustained oscillations are reestablished in said circuit means by termination of each such interruption period at a time during energy predominance of the oscillation frequency other than that sustained in said circuit means at the initiation of each such interruption period, and output means connected to said sustained oscillation circuit, including means responsive to a change in said circuit means from a particular stable oscillation frequency to the other stable oscillation frequency.

8. The circuit means defined in claim 7, wherein the sustained oscillation circuit and coupled resonant circuit means have circuit constants producing a material amplitude difference between the respective stable oscillation frequencies, and wherein the output means comprises a detecting circuit responsive to a material change in oscillation amplitude in one sense in the sustained oscillation circuit for producing an output pulse therefrom.

9. In combination, a first inductance-capacitance combination having a predetermined natural oscillation frequency, a second inductance-capacitance combination having approximately the same natural oscillation frequency and coupled in energy exchange relationship to said first combination to form a resultant network having two free oscillation frequencies, respectively above and below said natural oscillation frequency, a power source, oscillation sustaining means operatively connecting said power source to said network for applying oscillation sustaining power thereto at either such free oscillation frequency, and oscillation-interrupting means controlling operation of said oscillation-sustaining means for momentarily interrupting oscillation-sustaining power application to said network for a predetermined time period related to the constants of said network, to permit resumption of sustained oscillations therein at the other such free oscillation frequency upon termination of such momentary interruption.

10. In combination, a first inductance-capacitance combination having a predetermined natural oscillation frequency, a second inductance-capacitance combination having approximately the same natural oscillation frequency and coupled in energy exchange relationship to said first combination to form a resultant network having two free oscillation frequencies, respectively above and below said natural oscillation frequency, a power source, a transistor device having collector, emitter and base elements, circuit means forming an oscillation power circuit including said power source, said collector and base elements and at least one of said inductance-capacitance combinations, related circuit means forming an oscillation feedback circuit including said emitter and base elements and a control connection to said network for applying oscillation-sustaining power to said network at either such free oscillation frequency, and oscillation-interrupting means connected to one of said circuits and operable for momentarily interrupting oscillation-sustaining power application to said network for a predetermined time period related to the constants of said network, to permit resumption of sustained oscillations therein at the other such free oscillation frequency upon termination of such momentary interruption.

11. The combination defined in claim 10, wherein the oscillation-interrupting means comprises a recurringly operable generator of pulses having predetermined time duration applied to the oscillation feedback circuit for momentarily blocking operation of the transistor.

12. Counting circuit means comprising, in combination, at least two bistable oscillation trigger circuits consecutively arranged and individually comprising a first inductance-capacitance combination having a predetermined natural oscillation frequency, a second inductance-capacitance combination having approximately the same natural oscillation frequency and coupled in energy exchange relationship to said first combination to form a resultant network having two free oscillation frequencies, respectively above and below said natural oscillation frequency, a power source, oscillation-sustaining means operatively connecting said power source to said network for applying oscillation-sustaining power thereto at either such free oscillation frequency, each such bistable circuit having an output and an input triggerable for interrupting oscillation-sustaining operation of the oscillation-sustaining means, a source of trigger pulses of predetermined time duration operatively connected to the input of the first bistable circuit for momentarily interrupting sustained oscillations therein for a predetermined period terminating at a time when resumption of sustained oscillations therein occurs at the free oscillation frequency differing from that existing in the circuit at the initial instant of such interruption, and separate pulse generating means connected to the output of each such bistable circuit and responsive to a change of operation therein only from a particular free oscillation frequency to the other free oscillation frequency for generating a frequency-reversing trigger pulse therefrom of a duration corresponding to said predetermined time duration, each such pulse generating means being operatively connected to the input of the next succeeding bistable circuit for interruption of oscillation thereof and restoring such oscillation at a different frequency similarly to said first bistable circuit.

13. In combination a pulse generator triggerable to produce a voltage pulse of predetermined time duration, a transistor of the high internal base resistance type, having collector, emitter and base, a source of direct voltage, a load impedance, a first parallel resonant circuit, circuit means connecting said voltage source, load impedance, resonant circuit and said collector and base in series relationship to form an oscillation circuit, with said resonant circuit interposed between said load impedance and said base, a second resonant circuit coupled in energy exchange relation to the first such circuit and having approximately the same natural frequency, said resonant circuits and coupling therebetween establishing two free oscillation frequencies respectively above and below said natural frequency, an input circuit including a bias source connected between said emitter and base, said input circuit being connected to said pulse generator for rendering said transistor inoperative to sustain oscillations in said resonant circuits during such pulses, the constants of said resonant circuits being related to the time duration of such voltage pulses whereby frequency reversal alternately between such two free oscillation frequencies occurs in said oscillation circuit on successive pulses from said pulse generator.

14. In combination, a first inductance-capacitance combination having a predetermined natural oscillation frequency, a second inductance-capacitance combination having approximately the same natural oscillation frequency and coupled in energy exchange relationship to said first combination to form a resultant network having two free oscillation frequencies, respectively above and below said natural oscillation frequency, oscillation energy supply means operatively connected to said network for producing sustained oscillations therein at either such free oscillation frequency, and sustained-oscillation momentary interrupting means connected to said energy supply means for interrupting such sustained oscillations for a limited period permitting energy transfer to the other such free oscillation frequency, for resumption of sustained oscillations at the latter frequency.

15. In combination, a first inductance-capacitance combination having a predetermined natural oscillation frequency, a second inductance-capacitance combination having approximately the same natural oscillation frequency and coupled in energy exchange relationship to said first combination to form a resultant network having two free oscillation frequencies, respectively above and below said natural oscillation frequency, oscillation energy supply means operatively connected to said network for producing sustained oscillations therein at either such free oscillation frequency, sustained-oscillation momentary interrupting means connected to said energy supply means for interrupting such sustained oscillations for a limited period permitting energy transfer to the other such free oscillation frequency, for resumption of sustained oscillations at the latter frequency, and pulse generating means selectively responsive to a change of operation in such network from a particular sustained oscillation frequency to the other such frequency for generating an output pulse therefrom.

References Cited in the file of this patent

UNITED STATES PATENTS

| | | |
|---|---|---|
| 2,354,636 | Herschberger | July 25, 1944 |
| 2,728,856 | Hannum et al. | Dec. 27, 1955 |